United States Patent
König

(10) Patent No.: US 7,224,738 B2
(45) Date of Patent: May 29, 2007

(54) METHOD OF HIGH-FREQUENCY SIGNAL TRANSMISSION

(76) Inventor: Florian Meinhard König, Schellenbergstrasse 7, D-82110 Germering (DE)

( * ) Notice: Subject to any disclaimer, the term of this patent is extended or adjusted under 35 U.S.C. 154(b) by 899 days.

(21) Appl. No.: 09/844,114

(22) Filed: Apr. 27, 2001

(65) Prior Publication Data

US 2002/0003841 A1   Jan. 10, 2002

(30) Foreign Application Priority Data

Apr. 28, 2000   (DE)   ................. 100 20 857

(51) Int. Cl.
    *H04L 27/00* (2006.01)
(52) U.S. Cl. ............ 375/259; 455/287; 455/575; 455/454; 398/193; 398/141
(58) Field of Classification Search ............. 375/259; 359/110, 173; 343/702; 455/287, 575, 454; 398/141, 193

See application file for complete search history.

(56) References Cited

U.S. PATENT DOCUMENTS

| 3,311,704 | A | | 3/1967 | Filipowsky et al. ........ 370/493 |
| 3,694,754 | A | * | 9/1972 | Baltzer ..................... 455/287 |
| 5,598,288 | A | * | 1/1997 | Collar ...................... 398/193 |
| 6,054,959 | A | * | 4/2000 | Amos et al. ............... 343/702 |
| 6,396,600 | B1 | * | 5/2002 | Davies ........................ 398/9 |
| 2002/0160726 | A1 | * | 10/2002 | Konig | |
| 2003/0010872 | A1 | * | 1/2003 | Lewin et al. | |

FOREIGN PATENT DOCUMENTS

| DE | 44 14 235 A1 | 11/1994 |
| EP | 0 992 999 A1 | 4/2000 |
| JP | 09 220 284 | 8/1997 |
| WO | 98/28847 | 7/1998 |

OTHER PUBLICATIONS

"2000 PLUS", No. 144 (Dec. 1999, p. 74).
Herbert L. König, (1986) Bioinformation—Electrophysical Aspects, pp. 42-73.

* cited by examiner

*Primary Examiner*—Chieh M. Fan
*Assistant Examiner*—Eva Zheng
(74) *Attorney, Agent, or Firm*—Collard & Roe, P.C.

(57) ABSTRACT

A method for high-frequency signal transmission between a transmitter and a receiver. A signal for generating a natural electromagnetic alternating field is linked with HF transmission signal, and the HF transmission signal is extracted from the linked signals.

4 Claims, 3 Drawing Sheets

METHOD OF HIGH-FREQUENCY SIGNAL TRANSMISSION

CROSS REFERENCE TO RELATED APPLICATIONS

Applicants claim priority under 35 U.S.C. §119 of GERMAN Application No. 100 20 857.6 filed on Apr. 28, 2000.

BACKGROUND OF THE INVENTION

1. Field of the Invention

The invention relates to a method of transmitting a high-frequency signal between a transmitter and a receiver.

2. The Prior Art

The present invention relates to the field of digital signal transmission, such as a signal transmission of mobile telephones or hand-helds. These phones operate in the GSM, and in the future will operate in the UMTS data transmission format.

The problem with artificially generated electromagnetic fields used for transmitting data of hand-held and wireless telephones up to the GHz range, is that there is a pulsing of the fields in the range of 100 or several hundred Hz causing electrostress. This has an unfavorable effect on human biological cells. Particularly with wireless telephones and hand-helds, a distinct biological stress acting on human cells is unavoidable because of the high transmission power of such devices, and use of the hand-held by the ear of the user. In scientific publications and in the magazine "2000 PLUS", No. 144 (12-1999, page 74), Lebrecht von Klitzing wrote that the high dynamics of over 600 dB between pulse packet pauses of the useful HF-signal transmission triggers violent human cell irritations at a typical cell resonance of up to 400 Hz. Furthermore, the article states that the signal periodically represents an important factor especially when used by the ear, and that a stochastic signal behavior is substantially favorable for the biological cells because it is less harmful. Moreover, there is research available pertaining to unfavorable biological effects of artificial high-frequency fields on the biological cells of living creatures, in particular human beings (Herbert L. König, "Unsichtbare Umwelt" [Invisible Environment]; 1986 Munich).

SUMMARY OF THE INVENTION

An object of the present invention is to provide a method for high-frequency transmission between a transmitter and a receiver that provides substantially less electrostress on users of cell phones than methods currently employed.

This and other objects are accomplished by providing a signal for generating a natural electromagnetic pulsating field linked with an HF transmission signal. The HF transmission signal is then extracted from the linked signals in the receiver. In other words, the artificial electromagnetic alternating field for high-frequency signal transmission is combined with a natural electromagnetic pulsating field, which affects human cells in a positive way. This method superposes the effect of the HF transmission signal causing the electrostress to a high degree such that the negative effects are reduced, and consequently result in less physical stress.

Linking the HF transmission signal with the natural electromagnetic pulsating field can be accomplished in different ways. In a preferred method, the HF transmission signal is mixed with the signal for generating a natural alternating field. In another method, the HF transmission signal is modulated upon the signal for generating a natural electromagnetic alternating field. According to another alternative, the signal for generating a natural electromagnetic field is modulated upon the HF transmission signal. Alternatively, the HF transmission signal and the natural magnetic weather field can also be transmitted separately via a plurality of transmission antennas. Finally, the signal for generating a natural alternating electromagnetic field is inserted in the gaps of the HF transmission signal. The gaps available in the HF transmission signal, for example in the case of GSM data transmission, are adequately large for receiving the natural electromagnetic pulsating field that has a much lower frequency.

According to a further development of the invention, the natural electromagnetic alternating field approximately corresponds with an actual weather field, and preferably with a stress-reducing fair-weather field. The fair-weather field preferably comprises at least one spectral time curve of sferics, which are natural air-electrical discharge fields. Furthermore, the electromagnetic pulsating field, for example the fair-weather field, may comprise a Schumann resonance as a supplement and is a natural magnetic field.

The following is the definition of sferics and the Schumann resonance mentioned above. The Schumann resonance is a field disposition with a very low frequency. In particular, the Schumann resonance is a low-frequency magnetic field with a frequency starting at 8 Hertz. The magnetic field is a permanent field on the surface of the earth or in the ionosphere and is not connected with the electrical weather field. As early as 1905, Nikola Thesla made available low-frequency magnetic field therapy devices that exploit this low-frequency field disposition. These devices are now used again in medical applications such as disclosed in the following scientific literature: "Unsichtbare Umwelt" [Invisible Environment], Herbert L. König, Eigenverlag, Munich 1986.

In more recent years, the effects of electrical ULF-weather fields (ULF=ultralow frequency) existing in the atmosphere of the earth were investigated with respect to their effect on weather situations (see, for example, H. L. König and Hans Baumer in "Sferics" (Hans Baumer, Rowohlt Publishing Company, Hamburg, 1987). It was found that each specific weather situation has a defined field spectrum of such weather fields dependent upon time. A difference exists in terms of spectrum and time between statistic, synthetic-/techno-stochastic noise, and pseudo random sequences of sferics-atmospheric activities, or sferics-atmospheric fields. One phenomenon that can be attributed to the effect of sferics, is the "Föhn" wind noticeable near the Alps. It has been proven that the spectral composition and the intensity of the sferics are dependent upon the weather situation and the time.

This stochastic, natural electrical alternating field signal in the form of sferics is used in the present invention to reduce the electrostress that is connected with an artificial high-frequency signal transmission between a transmitter and a receiver.

To optimize the reduction of electrostress caused by the HF transmission signal, the intensity is set by signals that determine the weather field, for example the fair weather field. As an alternative, it is possible to adjust the ultralow-frequency field of the Schumann resonance for optimizing the reduction of electrostress caused by the HF transmission signal.

Furthermore, the given weather field is controlled by weather situation-related selective control information.

Signals determining the weather field are preferably used with time limitations and assembled in endless signal trains, i.e. they are randomized. This means that the spectrum is then known or recognizable with respect to its time structure for signal reception purposes specified herein later.

The HF transmission signal can be extracted in the receiver in different ways. Advantageously, the HF transmission signal is extracted in the receiver by means of the signal for generating the natural electromagnetic field, whose spectral time curve is filed in a memory of the receiver.

The HF transmission signal is preferably extracted from endless-repeat spectra of sferics by time spectrum recognition in the respective repeat period.

Furthermore, the HF transmission signal is preferably extracted by digital subtraction of the stored signal for generating the natural electromagnetic field selected in each case from the received signal spectrum.

The method for high-frequency signal transmission between a transmitter and a receiver can be used in various fields of application. The method is preferably applied in telecommunications, in particular for GSM and UMTS data transmission. Another preferred field of application is the analog and digital radar and radio and television signal transmission, and the data transmission with the wireless telephone.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
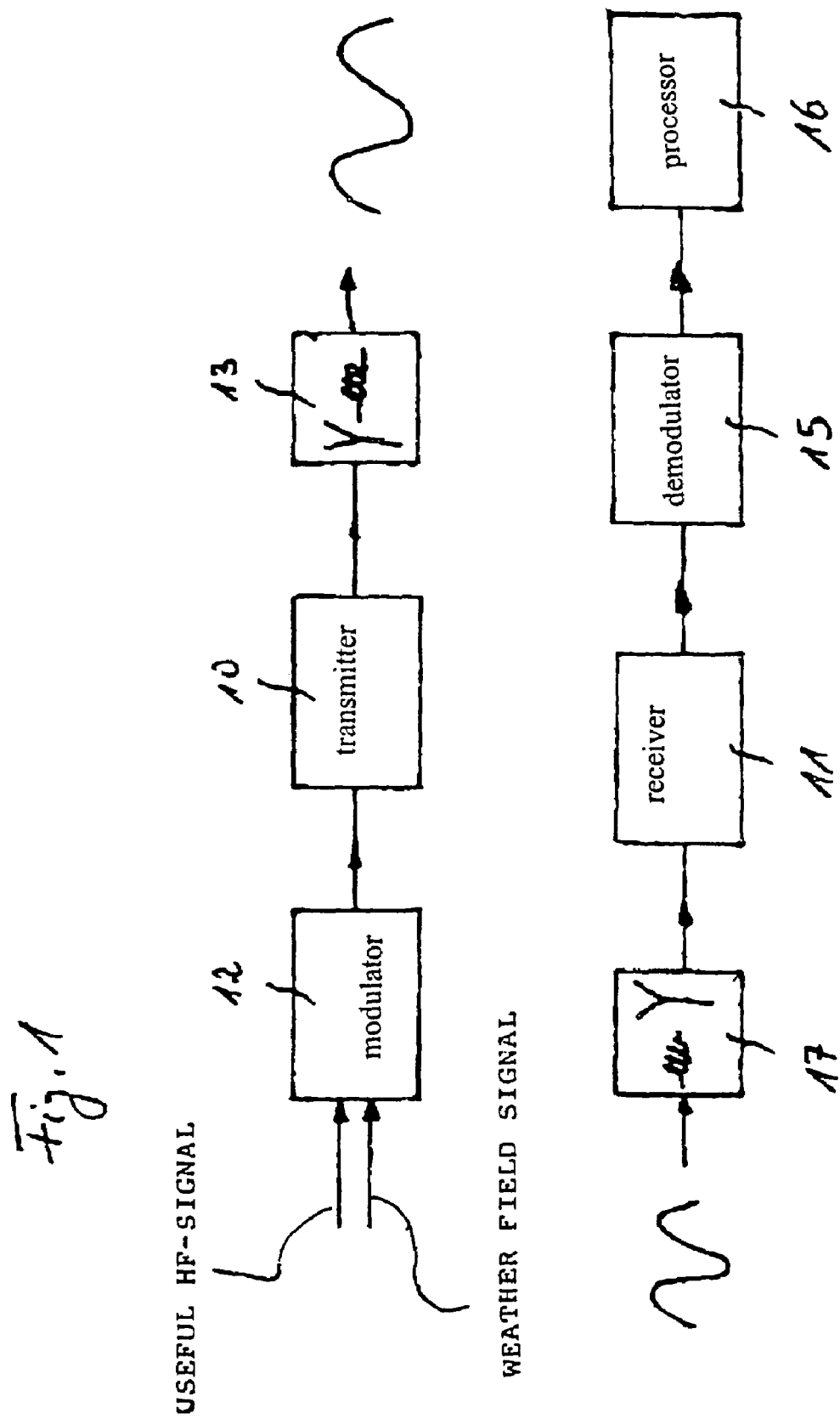
FIG. 1 shows a schematic block diagram representation showing an arrangement for carrying out the method according to the present invention.

Referring now in detail to the drawings and, in particular, FIG. 1, there is shown a schematic representation of high-frequency signal transmission with reduction of the electrostress acting on human cells.

Figure 2:
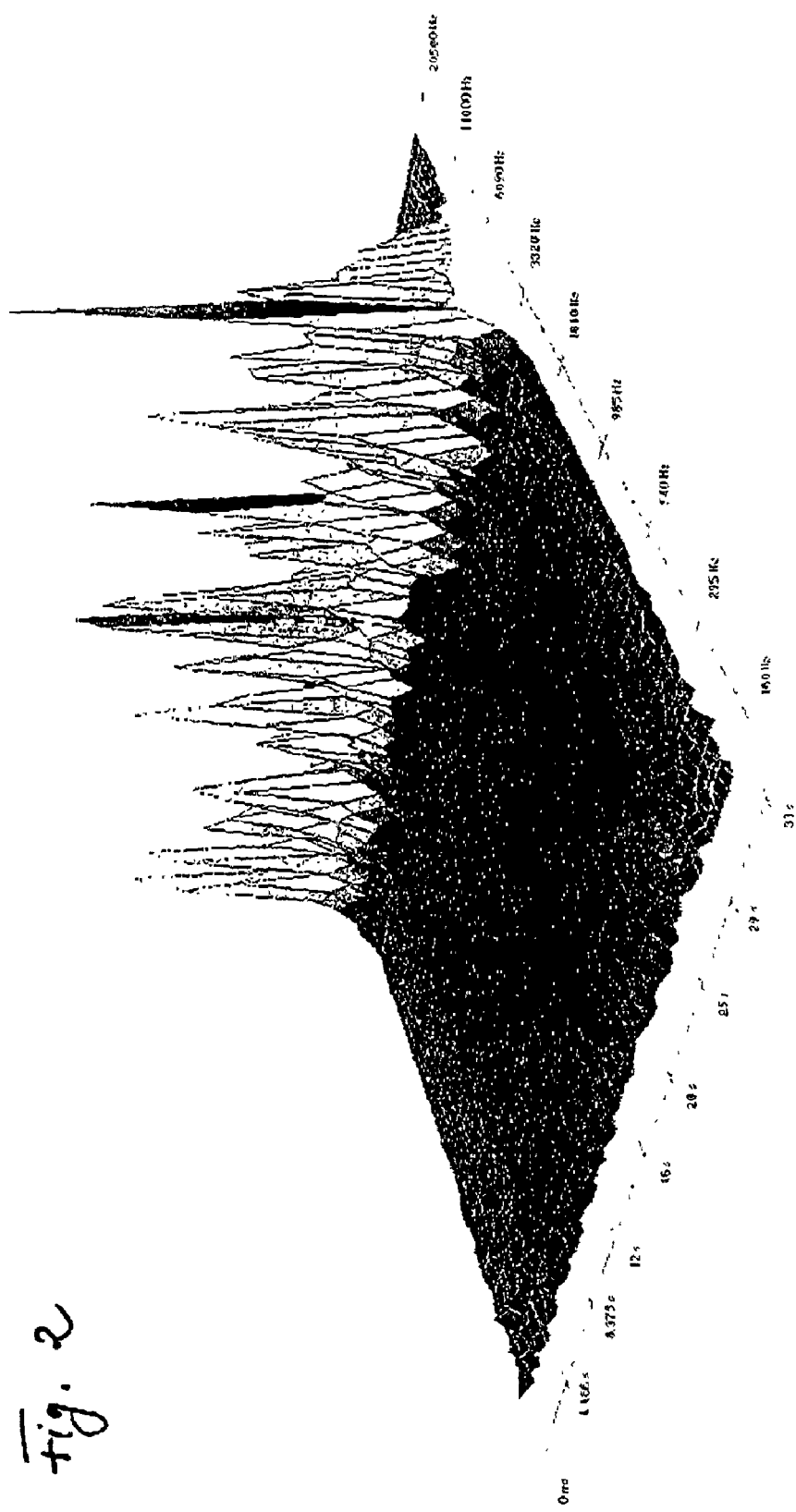
FIG. 2 shows a diagram of the frequency curve of a typical sferics.

A transmitter 10 and a receiver 11 are provided. A modulator 12 is connected upstream of transmitter 10 and a HF-signal and a signal for generating a weather field, in particular a fair-weather field, are attached to the input side of modulator 12. The HF signal is a GSM-signal for transmission via transmitter 10 and an antenna. The GSM-signal typically has a frequency of 0.4 to 1.8 GHz. Furthermore, this signal is a pulsation of several hundreds Hertz. This HF-signal reduces the stress acting on human cells. To reduce the electrostress, the HF-signal is linked or modulated with a low-frequency weather field signal, preferably with a fair-weather field signal. This fair-weather signal is typically in a frequency range between 1000 Hz and 20,000 Hz. A corresponding weather field is an electromagnetic field that occurs in nature and denotes weather situations and is shown in FIG. 2. A fair-weather field situation comprises spectral distribution of sferics.

As stated above, the HF signal is modulated in modulator 12 by the weather field signal. As an alternative, the weather field signal can be modulated with the HF-signal, or transmitted via a plurality of parallel antenna elements.

Instead of using modulator 12, it is possible to use a circuit that links the weather field signal with the HF-signal in some other way, for example by inserting the weather field signal in gaps of the HF-signal. It is important that a mixture of the artificial HF-field and a natural weather field is radiated by transmitter 10.

The output signal of modulator 12 is fed into transmitter 12 and radiated via an antenna installation 13. Antenna installation 13 comprises an antenna element suitable for this purpose, or a plurality of such antenna elements "Y".

Figure 3:
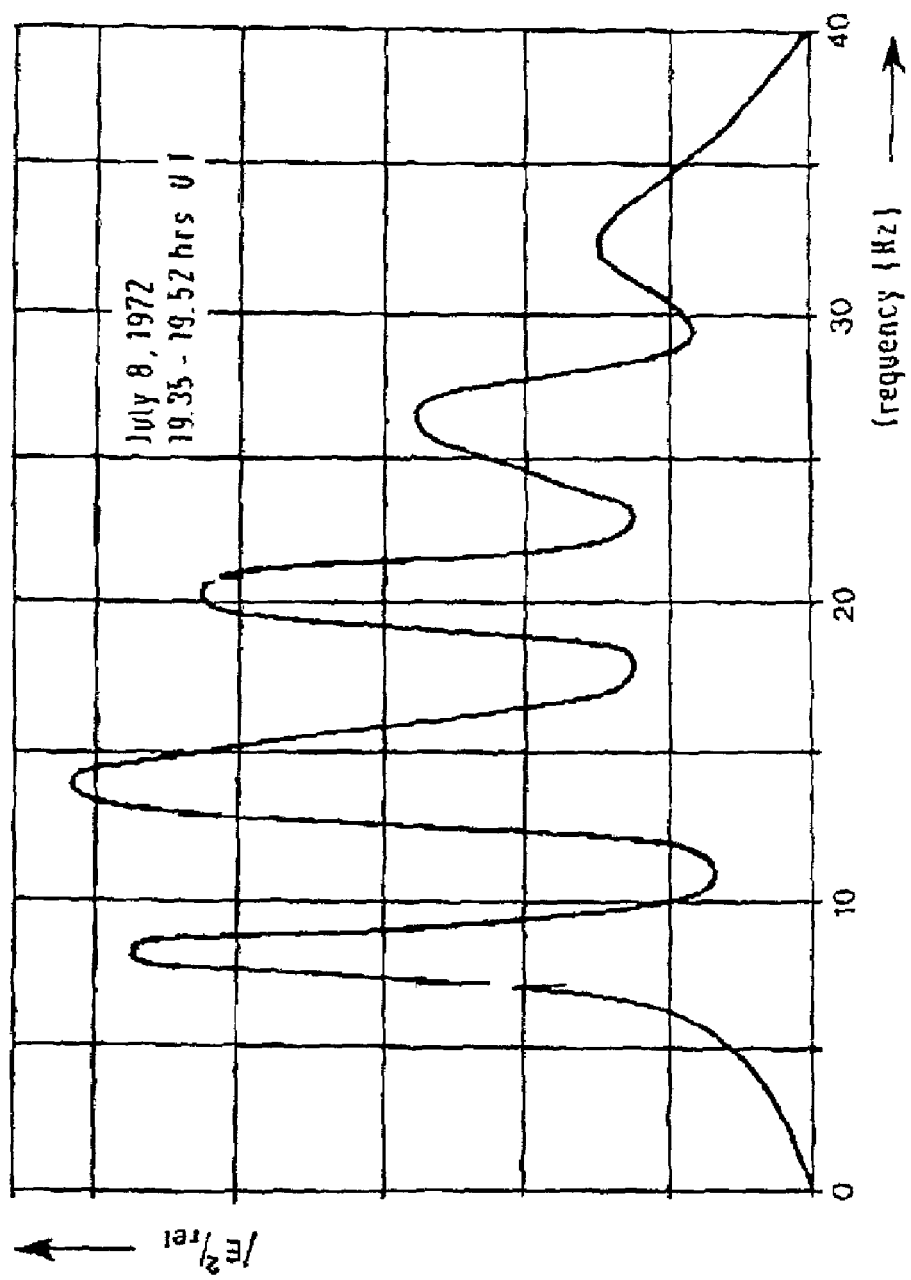
FIG. 3 shows a diagram of a typical Schumann resonance.

In addition, it is possible to directly feed into antenna installation 13 a signal conforming to the Schumann resonance, as denoted by the symbol of a coil. As explained above, a Schumann resonance is jointly radiated by antenna installation 13, and is a magnetic field, serves the purpose of reducing the stress acting on the cells of living creatures. This stress being caused by the artificially generated, useful low-frequency field. In particular, the Schumann resonance has been proven to act on living creatures in a stress-relieving and relaxing manner. An example of a Schumann wave is shown in FIG. 3. FIG. 3 shows a diagram of a mixed spectrum of a highly constant oscillation in the range of about 5 Hz to 35 Hz. This oscillation is integrated over 17 minutes, whereby the frequency is plotted on the X-axis and the magnetic field is plotted on the Y-axis.

In the case of a GSM-signal transmission, transmitter 10 may be both a transponder and the transmitting part of a hand-held phone.

A demodulator 15 is connected downstream of receiver 11. Demodulator 15 has an inverse function, i.e. it extracts or unlinks or demodulates the mixture comprising the HF-signal and the weather field signal so that the HF-signal, (which is now relieved of the weather field signal) is available on the output of demodulator 15 for processing in a processor 16. Important is that in the path between antenna installation 13 and a corresponding antenna installation 17 being connected upstream of receiver 11, a natural weather field exists in addition to the artificial HF-field that causes electrostress, and neutralizes the effect of the artificial HF-field. The result is that living creatures in the transmission path between the transmitter and the receiver are exposed to a distinctly reduced electrostress load by the HF-field. Demodulator 15 is preferably of the intelligent type, so that it recognizes sferics spectra in the signals of the fields received with antenna installation 17. Following such recognition, demodulator 15 extracts the known periodically repeated sferics curve so that the HF-signal is available in the recovered form on the output of demodulator 15.

Accordingly, while only a few embodiments of the present invention have been shown and described, it is obvious that many changes and modifications may be made thereunto without departing from the spirit and scope of the invention.

What is claimed is:

1. A method for reducing an electrostress acting on human cells when transmitting a high frequency signal between a transmitter and a receiver, the method comprising the steps of:
   a) linking the high frequency signal with a signal for a natural alternating electromagnetic field to form a linked signal in the transmitter, wherein the signal for the natural alternating electromagnetic field approximately conforms to an actual weather field; and b) extracting the high frequency signal from the linked signal in the receiver, wherein said step of extracting the high frequency signal in the receiver from the signal for the natural alternating electromagnetic field occurs by reading a given spectral time curve stored in a memory of the receiver, wherein said extracting step occurs by extracting from an endless repeat spectra of sferics each being recognized in terms of time by means of time spectrum recognition in a respective repeat period;

wherein the electrostress on surrounding human cells is reduced via the presence of the natural alternating electromagnetic field in addition to the high frequency field.

2. The method according to claim 1, further comprising the step of adjusting an intensity of a signal fixing said actual weather field according to the high frequency signal for optimizing a reduction of electrostress.

3. The method according to claim 1, wherein a signal fixing said actual weather field is time limited and assembled in an endless signal train.

4. The method according to claim 1, wherein said extracting step further comprises the step of digitally subtracting a selected signal for the natural alternating electromagnetic field from a received mixed signal spectrum.

* * * * *